(12) United States Patent
Deats

(10) Patent No.: US 11,939,265 B2
(45) Date of Patent: *Mar. 26, 2024

(54) HIGH TEMPERATURE THERMO-ACOUSTIC BARRIER MATERIAL WITH LOW SMOKE AND ODOR

(71) Applicant: Lydall Performance Materials (US), Inc., Lancaster, PA (US)

(72) Inventor: Mary C. Deats, Macungie, PA (US)

(73) Assignee: Lydall Performance Materials (US), Inc., Lancaster, PA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/477,339

(22) Filed: Sep. 16, 2021

(65) Prior Publication Data

US 2022/0002204 A1    Jan. 6, 2022

Related U.S. Application Data

(63) Continuation-in-part of application No. 15/919,484, filed on Mar. 13, 2018, now Pat. No. 11,168,602.

(51) Int. Cl.
| | |
|---|---|
| *C04B 33/04* | (2006.01) |
| *B60R 13/08* | (2006.01) |
| *F01N 13/14* | (2010.01) |
| *F01N 13/16* | (2010.01) |

(52) U.S. Cl.
CPC .............. *C04B 33/04* (2013.01); *F01N 13/14* (2013.01); *F01N 13/16* (2013.01); *B60R 13/0815* (2013.01); *B60R 13/0869* (2013.01); *F01N 2510/02* (2013.01)

(58) Field of Classification Search
CPC ......... C04B 33/04; F01N 13/14; F01N 13/16; F01N 2510/00; B60R 13/0815; B60R 13/0869

See application file for complete search history.

(56) References Cited

U.S. PATENT DOCUMENTS

| | | | |
|---|---|---|---|
| 2,576,698 | A | 11/1951 | Russum |
| 5,674,603 | A | 10/1997 | Stiles et al. |
| 6,851,506 | B2 | 2/2005 | Bovio |
| 6,964,801 | B1 | 11/2005 | Bretschneider et al. |
| 6,966,402 | B2 | 11/2005 | Matias et al. |
| 7,297,384 | B2 | 11/2007 | Crowley |
| 7,585,559 | B2 | 9/2009 | Schroeder et al. |
| 7,943,227 | B2 | 5/2011 | Connelly |
| 9,718,447 | B2 | 8/2017 | Waltz |
| 11,168,602 | B2 * | 11/2021 | Deats ..................... F01N 13/16 |
| 2008/0167407 | A1 | 7/2008 | Kishore et al. |
| 2010/0021718 | A1 | 1/2010 | Vos et al. |
| 2010/0163002 | A1 | 7/2010 | Kamiyama |
| 2015/0260075 | A1 | 9/2015 | Schweiggart |

FOREIGN PATENT DOCUMENTS

| | | |
|---|---|---|
| CN | 101535389 A | 9/2009 |
| CN | 203231326 U | 10/2013 |
| CN | 104176991 A | 12/2014 |
| CN | 205400876 U | 7/2016 |
| DE | 38 34 054 A1 | 4/1990 |
| DE | 38 34 054 C3 | 6/2002 |
| GB | 2 167 060 A | 5/1986 |
| GB | 2167060 * | 5/1986 |
| JP | 07330360 A | 12/1995 |
| JP | 2002-81317 A | 3/2002 |
| WO | WO 98/49118 A1 | 11/1998 |

OTHER PUBLICATIONS

Canadian Office Action issued in Canadian Application No. 3,094,813 dated Dec. 13, 2021 (three (3) pages).
Korean-language Office Action issued in Korean Application No. 10 2020 7029976 dated Aug. 1, 2022 with English translation (four (4) pages).
Chinese-language Office Action issued in Chinese Application No. 201880091568.5 dated Aug. 3, 2022 (five (5) pages).
Written Opinion of International App. No. PCT/US2018/023226, dated Oct. 25, 2018, which is in the same family as U.S. Appl. No. 15/919,484 (seven (7) pages).
International Search Report of International App. No. PCT/US2018/023226, dated Oct. 25, 2018, which is in the same family as U.S. Appl. No. 15/919,484 (five (5) pages).
Frenzelit Technical Data Sheet, novaplan® HT 03075, No date.
Frenzelit Technical Data Sheet, novaplan® HT 03000, No date.
Frenzelit Technical Data Sheet, novaplan® HT 02980, No date.
Frenzelit Technical Data Sheet, novaplan® HT 03075, http:www.frenzelit.net/982_novaplan_sup_sup_ht_03075.html, Feb. 23, 2018.
CiAdvanced, "Morgan Advanced Materials: Heat Shield Materials," https:www.ceramicindustry.com/articles/94675-morgan-advanced-materials-heatshield, Feb. 23, 2018.
Hindi-language Office Action issued in Indian Application No. 202017044732 dated Mar. 18, 2021 with English translation (six (6) pages).
Extended European Search Report issued in European Application No. 18910737.8 dated Aug. 16, 2021 (six (6) pages).
Office Action issued in counterpart Chinese Application No. 201880091568.5, dated Sep. 13, 2021, (10 pages).

(Continued)

*Primary Examiner* — C Melissa Koslow
(74) *Attorney, Agent, or Firm* — Crowell & Moring LLP

(57) ABSTRACT

A thermal barrier material for use in shielding components of a vehicle from hot exhaust surfaces includes 35 to 53% of a plurality of clays by weight and a remainder including magnesium silicate, alumina trihydrate, alumino-borosilicate glass, rock wool, basalt fiber, acrylamide copolymer coagulant, acrylic latex, fatty alcohol alkoxylate, or anionic polyacrylamide. A sample of the thermal barrier material, when exposed to a temperature of 400° Celsius, produces smoke having a density less than 5 g/cm$^3$ as measured according to the ISO 5659-2:2006(E) standard.

4 Claims, 10 Drawing Sheets

(56) References Cited

OTHER PUBLICATIONS

Chinese-language Office Action issued in Chinese Application No. 201880091568.5 dated Apr. 19, 2022 with English translation (six (6) pages).
Korean-language Office Action issued in Korean Application No. 10-2020-7029976 dated Feb. 14, 2022 with English translation (5 (five) pages).
Korean-language Office Action issued in Korean Application No. 10-2020-7029976 dated Feb. 21, 2023 with English translation (six (6) pages).

* cited by examiner

| Hot Plate Test | | | Thermal K | |
|---|---|---|---|---|
| Material | Temp (°C) | | Tested Per ASTM F433 | |
| 0.8mm | | | Material | Conductivity |
| TI650 | 313 | | TI650 | 0.114 |
| TI1K | 304 | | TI1K | 0.095 |
| Competitor F | 324 | | Competitor F | 0.188 |
| 1.0 mm | | | | |
| TI650 | 322 | | | |
| TI1K | 289 | | | |
| Competitor F | 323 | | | |

Toxicity of Generated Gasses (Performed by External Test Lab)

* ASTM 800: Measurement of Gasses Present or Generated During Fires (Toxicity Assessment)

| MATERIAL TESTED | TOXICITY | |
|---|---|---|
| | CO | $CO_2$ |
| Competitor F | 111 | 900 |
| TI1K | 46 | 599 |

Test Properties of Frenzelit PRO versus TI1K

| | Units | Method | Frenzelit PRO | TI1K |
|---|---|---|---|---|
| Caliper | mm | ASTM F104 | 0.80 | 0.857 |
| Density | g/cm$^3$ | ASTM F1315 | 1.15 | 0.90 |
| Horizontal Flame Spread | n/a | SAE J369 | DNI | DNI |
| Compression/Recovery | % | ASTM F36K | 16/28 | 20/27 |
| Thermal Conductivity at 300°C | W/m·K | ASTM F433 | 0.141 | 0.138 |
| Shock Flame Test (1000°C) | n/a | n/a | 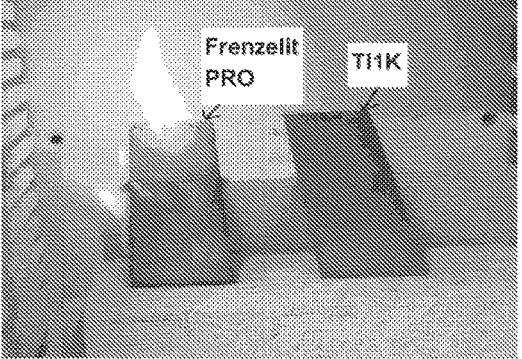 | |
| Smoke/Odor Assessment (400°C) | n/a | WI-TP-041_0 | No Smoke/ Strong odor | No Smoke/Odor barely detectable |
| Odor Evaluation (GC/MS) | ppm | n/a | 1-butanol : 4.58  Dimethoxymethane: 190 | 1-butanol: 0  Dimethoxymethane: 42.6 |
| Flexibility (6.5") | n/a | WI-TP-033_0 | Pass | Pass |
| Cold Forming/Vibration Testing | n/a | WI-TP-032_0 | No cracks / Sample in-tact after heating and vibration | Small cracks / Sample in-tact after heating and vibration |
| Tensile (CMD) | MPa | ASTM F152 | 1.2 | 2.7 |
| TGA | n/a | WI-TP-009_A | 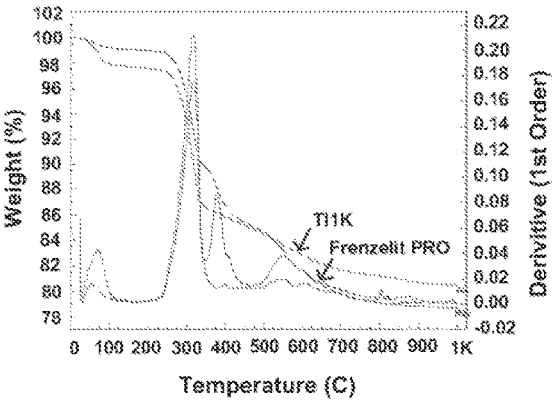 | |

Fig. 12

Test Properties of Frenzelit ECO versus TI650

| | Units | Method | Frenzelit ECO | TI650 |
|---|---|---|---|---|
| Caliper | mm | ASTM F104 | 0.78 | 0.81 |
| Density | g/cm$^3$ | ASTM F1315 | 1.15 | 0.90 |
| Horizontal Flame Spread | n/a | SAE J369 | DNI | DNI |
| Compression/Recovery | % | ASTM F36K | 17/26 | 20/26 |
| Thermal Conductivity at 300°C | W/m·K | ASTM F433 | 0.151 | 0.153 |
| Shock Flame Test (650°C) | n/a | n/a | 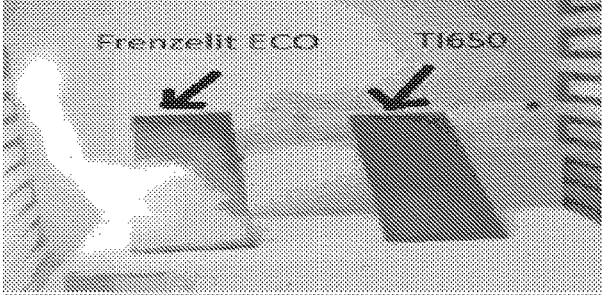 | |
| Smoke/Odor Assessment (400°C) | n/a | WI-TP-041_0 | No Smoke/ Strong odor | No Smoke/Odor barely detectable |
| Odor Evaluation (GC/MS) | ppm | n/a | 1-butanol : 6.14 Dimethoxymethane: 224 | 1-butanol: 0 Dimethoxymethane: 55 |
| Flexibility (6.5") | n/a | WI-TP-033_0 | Pass | Pass |
| Cold Forming/Vibration Testing | n/a | WI-TP-032_0 | No cracks / Sample in-tact after heating and vibration | Small cracks/Sample in-tact after heating and vibration |
| Tensile (CMD) | MPa | ASTM F152 | 2.15 | 3.2 |
| TGA | n/a | WI-TP-009_A | 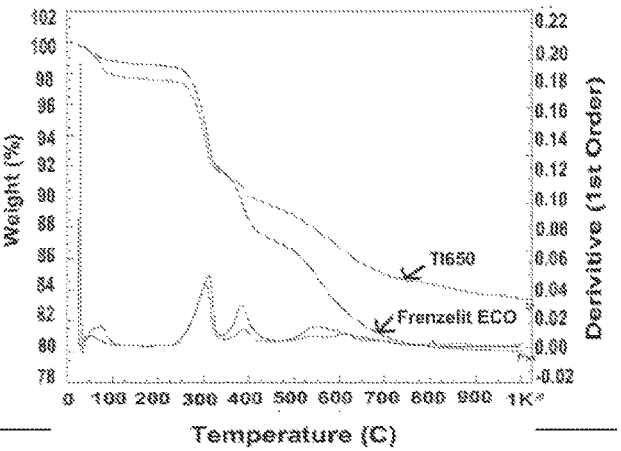 | |

# HIGH TEMPERATURE THERMO-ACOUSTIC BARRIER MATERIAL WITH LOW SMOKE AND ODOR

CROSS REFERENCE TO RELATED APPLICATIONS

This application is a continuation-in-part of U.S. patent application Ser. No. 15/919,484, filed Mar. 13, 2018, now U.S. Pat. No. 11,168,602, issued Nov. 9, 2021

TECHNICAL FIELD

This disclosure relates generally to heat shield barriers and more particularly to high temperature barriers for use as heat shields in the automotive and other industries. The disclosure also relates to high temperature barriers that also exhibit acoustic absorption properties.

BACKGROUND

Heat shield material has long been used in automotive manufacturing to shield panels, electronics, wiring, and other components from the heat of adjacent hot surfaces such as an exhaust manifold or a catalytic converter. In recent years, increasing engine efficiencies and increasing emissions standards have resulted in higher engine and exhaust system temperatures. As a result, certain components of engines, and exhaust systems in modern vehicles can be significantly hotter in operation than in the past. For example, un-burnt gasoline in an exhaust stream is sometimes intentionally burned in the catalytic converters thereby increasing the temperature of the converters' outer surfaces compared to older technology. Surrounding panels and components must be protected from this heat.

Traditional heat shields and thermal barriers in vehicles typically have a three-layer construction comprising a thermal insulation material sandwiched between two aluminized steel plates. As temperatures have increased, these traditional heat shields have begun to exhibit various problems and shortcomings. For example, some original equipment manufacturers (OEMs) have received customer complaints of a campfire-like odor accompanied by smoke being detected in the passenger cabin during the initial operation of new vehicles. The root cause of the odor and smoke has often been determined to be the burn-out of organic components such as binders and cellulosic fibers in the thermal barrier material of heat shields.

The demand for quieter vehicles has resulted in requirements for better acoustic absorption as well. Much of the need for acoustic absorption is beneath the floor panels of vehicles where hot surfaces of exhaust systems exist. This poses a challenge because acoustic absorption materials are not always able to withstand high temperatures present near exhaust components of a vehicle. This is a related problem in need of a solution.

Accordingly, a need exists for a thermal barrier material that addresses and solves the problems of ignition, smoke, and unpleasant odors encountered with traditional prior art thermal barriers when exposed to high temperatures in modern vehicles. A further need exists for a thermal barrier that also exhibits acoustic absorption properties in regions of high temperatures. These thermal and acoustic absorption materials should be producible on traditional paper making machines and should be moldable to desired shapes without losing their integrity. It is to the provision of a thermo-acoustic barrier material that addresses these and other needs that the present subject matter is primarily directed.

SUMMARY

Briefly described, a high temperature thermal barrier material is provided that can withstand temperatures up to 1000° C. without producing significant amounts of smoke and unpleasant odor. The material is made in sheets on a traditional paper making or Fordenier machine and may be formed into desired shapes and configurations before or after it is completely dry. In one embodiment for use in lower temperature environment, the barrier material has demonstrated the ability to withstand temperatures of 650° C. (1112° F.) for extended periods of time without burning, producing smoke, or emitting unpleasant odors. This embodiment will be referred to herein as the TI650 embodiment. In another embodiment, the barrier material has demonstrated the ability to withstand temperatures of 1000° C. (1832° F.) without these undesirable effects. This embodiment is referred to herein as the TI1000 (TI1K) embodiment.

In another embodiment, the thermal barrier material is bonded to one side of an acoustic absorption material to form a thermo-acoustic barrier. In a heat shield, the thermal barrier is oriented so that it faces a hot surface such as the surface of a catalytic converter with the acoustic absorption material facing away from the hot surface. The thermal barrier has a low thermal conductivity so that heat does not pass easily through to the acoustic absorption material. The acoustic absorption material is thus protected from the heat and functions to absorb sound that might otherwise penetrate the passenger compartment. The result is a quieter cooler vehicle in which panels, wiring, and other components are shielded from the high temperatures of the exhaust system.

A method of forming the high temperature thermo-acoustic shield also is disclosed. Briefly, the method comprises spreading a layer of thermal barrier material in the form of a slurry on the surface of an acoustic absorption material to form a layered thermo-acoustic composite. The acoustic absorption material may be perforated before the thermal barrier material is spread on its surface. The thermal barrier material flows into the perforations and bonds the two layers of material securely together. The thermal barrier material is then de-watered and dried in a paper making machine. Finally, the thermo-acoustic material may be formed into a specific desired configuration to fit in a designated area and sandwiched between aluminized metal plates for support, durability, and heat reflection.

These and other aspects, features, and advantages of the present subject matter will be appreciated better upon review of the detailed description set forth below made in conjunction with the accompanying drawing figures, which are briefly described as follows.

BRIEF DESCRIPTION OF THE DRAWINGS

FIG. 10 is a chart showing results of the side-by-side testing of a prior art thermal barrier and a thermal barrier of the present subject matter for toxicity of gasses generated when heated.

FIG. 11 is a summary chart compiling the results of various tests conducted on the TI1000 (TI1K) thermal barrier of the present subject matter and a prior art thermal barrier with similar performance specifications.

FIG. 12 is a summary chart compiling the results of various tests conducted on the TI650 thermal barrier of the present subject matter and a prior art thermal barrier with similar performance specifications.

DETAILED DESCRIPTION OF THE DRAWINGS

Figure 1:
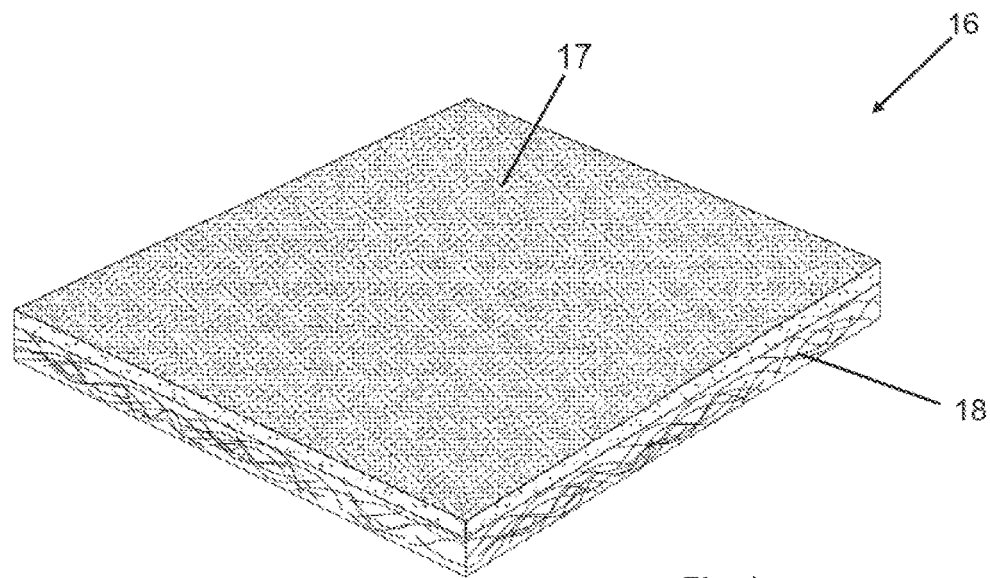
FIG. 1 is a perspective view of a thermo-acoustic barrier in flat sheet form that embodies principles of the present subject matter.

Reference will now be made in more detail to the drawing figures, wherein like reference numerals indicate like parts throughout the several views. FIG. 1 illustrates a thermo-acoustic barrier that embodies principles of the present subject matter in one preferred form. The thermo-acoustic barrier 16 comprises a high temperature thermal barrier layer 17 bonded to an acoustic absorption layer 18. The term "high temperature" as used herein means temperatures encountered adjacent hot surfaces of modern engines and exhaust systems. Such temperatures generally range from between 650° C. and 1000° C. (1112° F. and 1832° F.) but can be somewhat lower or higher in specific cases. The high temperature thermal barrier layer 17 is formulated and fabricated as detailed below to withstand high temperatures while generating very low (compared to the prior art) smoke and very low odor intensity and offensiveness.

Figure 2:
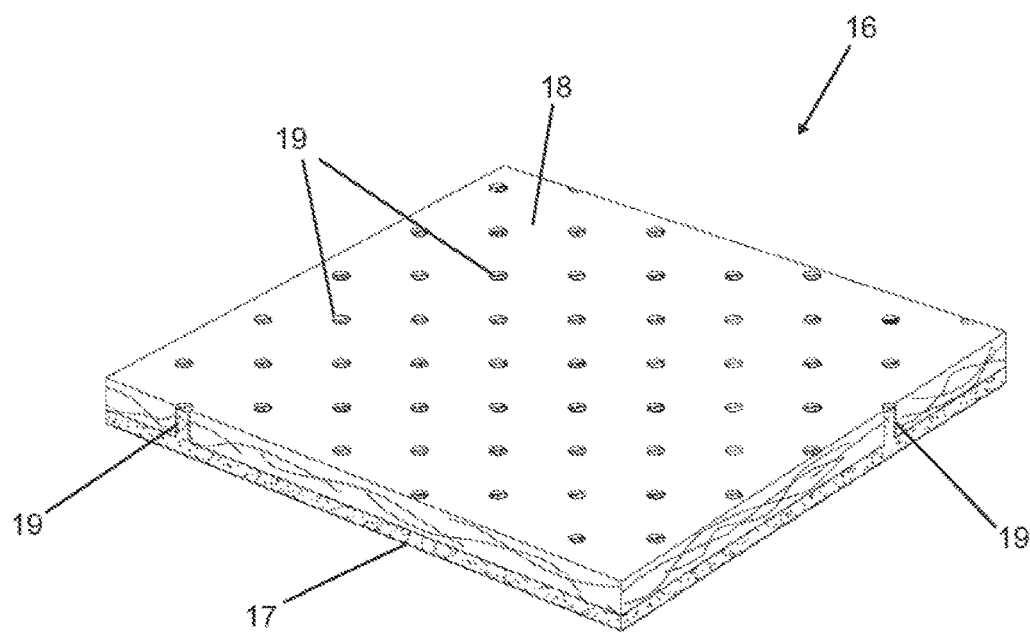
FIG. 2 is a side elevational view of the barrier of FIG. 1 showing the layered construction of the barrier.
Figure 3:
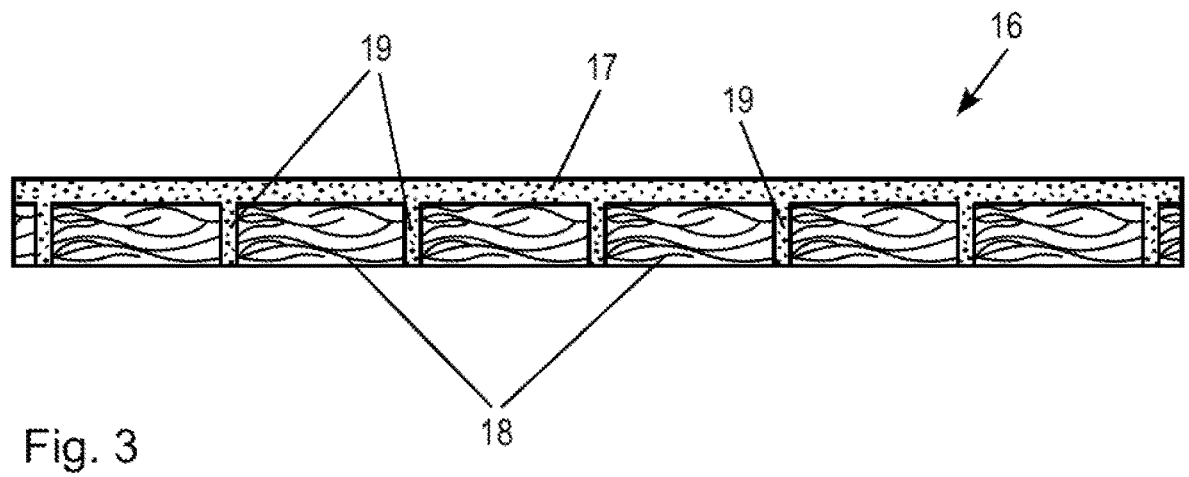
FIG. 3 is a perspective view of the thermo-acoustic barrier as seen from the opposite side.

An acoustic absorption layer 18 is secured to the thermal barrier layer 17 on one side thereof. The acoustic absorption layer 18 can be secured to the thermal barrier layer by any appropriate means such as with an adhesive for example. One preferred method of securing the layers together is shown in FIGS. 2 and 3. FIG. 2 shows the thermo-acoustic barrier 16 with the acoustic absorption layer facing up and FIG. 3 shows a cross section of the thermo-acoustic barrier. In this embodiment, the acoustic absorption layer 18 is punched to form a plurality of holes 19 that extend through the acoustic absorption layer.

The thermal barrier layer 17 is initially applied in the form of a slurry onto an upwardly facing surface of the acoustic absorption layer 18. The slurry flows partially into the holes 19 as perhaps best illustrated in FIG. 2. As the slurry is dewatered and dried, preferably using a Fourdrinier or other type of paper making machine, the thermal barrier material in the holes 19 dries and locks the thermal barrier layer 18 and the acoustic absorption layer 17 together with a mechanical bond.

The acoustic absorption layer 18 may be formed of any material that performs the function of absorbing sound before it enters the passenger compartment of a vehicle. In the preferred embodiment, the acoustic absorption layer 18 is made of a non-woven fiberglass sound absorbing material such as that available from Owens Corning Corporation of Toledo, Ohio and other suppliers. Other possible materials that may be suitable for the acoustic absorption layer include, without limitation, cotton and organic sound absorbing batts, silica fiber mats, and sound absorbing foam to mention a few.

While the thermo-acoustic barrier is shown as a flat sheet or tile in FIGS. 1 and 2, in use the barrier often will be shaped to fit in a specific tight space between a hot surface such as a catalytic converter and the floor panels of a vehicle. Furthermore, the thermo-acoustic panel may be adhered to one side of a shaped aluminized metal sheet or sandwiched between two metal sheets that can be pressed into a desired shape and serve as thermal reflectors. So, the flat sheet or tile shown in the illustrative embodiment is not intended to limit the present subject matter, but only to illustrate the layered construction of the barrier in a simple and easily understood form.

As detailed below, it has been found through experimentation that the smoke and unpleasant odors often produced by prior art thermal barriers (of which consumers complain) result from the burn-off of organic binders and other organic compounds present in the material of these barriers. In contrast, the materials from which the thermal barrier of the present subject matter is made are very low in organic compounds and binders compared to prior art thermal barriers. In one preferred embodiment, the thermal barrier of this present subject matter may be made as follows.

Making the Thermal Barrier

Table 1 below shows the ingredients used to make the example TI650 and TI1000 (TI1K) thermal barrier materials of the present subject matter and, for each ingredient, the percent-by-weight of the ingredient used in a slurry to be made into the thermal barrier material in a paper making machine.

TABLE 1

|  | TI650 | TI1K |
| --- | --- | --- |
| magnesium silicate | 17-23 | 8-12 |
| aluminum phyllosilicate clay | 2-5 | 2-5 |
| hydrous aluminum silicate | 17-23 | 8-12 |
| hydrous magnesium silicate (talc) | 12-18 | 12-18 |
| phyllosilicate (mica) | 4-7 | 4-7 |
| alumina trihydrate | 17-23 | 35-43 |
| alumino-borosilicate glass | 2-6 | 2-6 |
| dye | 1-1.5 | 0.5-1.5 |
| rock wool | 6-8 | 6-8.5 |
| basalt fiber | 1-6 | 4-7 |
| acrylamide copolymer coagulant | 0.05-1.5 | 0.05-1.5 |
| acrylic latex | 0.07-1.2 | 0.05-0.95 |
| fatty alcohol alkoxylate | 0.01-0.05 | 0.01-0.05 |
| anionic polyacrylamide | 0.5-1.5 | 0.5-1.5 |
| cellulose fiber | 1-1.8 | 0 |

The TI650 and TI1000 (TI1K) are merely example embodiments of the present subject matter and should not be construed to limit the scope of the present subject matter to these example embodiments. Various modifications and substitutions may be made. For instance, several of the ingredients listed in Table 1 above may be generally considered clays in the art, such as aluminum phyllosilicate clay, hydrous aluminum silicate, phyllosilicate (mica), and hydrous magnesium silicate (talc). These clays may be generally substituted in their proportions or replaced altogether with other clays suitable for use in thermally shielding hot surfaces, such as exhaust components of a vehicle. Such variations and/or substitutions in the proportions of the ingredients may achieve nuanced variations in the performance of the overall thermal barrier material without substantially compromising the net objective of reducing smoke and odor when exposed to heat when compared with thermal barrier materials of the prior art.

A third example thermal barrier material that, when exposed to a temperature of 400° Celsius, produces smoke having a density less than 5 g/cm$^3$ as measured according to the ISO 5659-2:2006(E) standard may include 35 to 53% of a plurality of clays by weight and a remainder including one or more of magnesium silicate, alumina trihydrate, alumino-borosilicate glass, rock wool, basalt fiber, acrylamide copolymer coagulant, acrylic latex, fatty alcohol alkoxylate, or anionic polyacrylamide. As previously discussed, the clays may include one or more of aluminum phyllosilicate clay, hydrous aluminum silicate, phyllosilicate (mica), and hydrous magnesium silicate (talc). Other clays suitable for use in thermal shielding for vehicles may be also be substituted or use in conjunction with the clays previously discussed. Table 2 below shows the ingredients used to make the third example thermal barrier material of the present subject matter and, for each ingredient, the percent-by-weight of the ingredient used in a slurry to be made into the thermal barrier material in a paper making machine.

Third Example Thermal Barrier Material

TABLE 2

| | |
|---|---|
| one or more of: aluminum phyllosilicate clay, hydrous aluminum silicate, phyllosilicate (mica), or hydrous magnesium silicate (talc) | 35-53 |
| one or more of: magnesium silicate, alumina trihydrate, alumino-borosilicate glass, rock wool, basalt fiber, acrylamide copolymer coagulant, acrylic latex, fatty alcohol alkoxylate, or anionic polyacrylamide, dye, cellulose fiber | 47-65 |

A fourth example thermal barrier material that, when exposed to a temperature of 400° Celsius, produces smoke having a density less than 5 g/cm$^3$ as measured according to the ISO 5659-2:2006(E) standard may include 26% to 42% of a plurality of clays by weight and a remainder including one or more of magnesium silicate, alumina trihydrate, alumino-borosilicate glass, rock wool, basalt fiber, acrylamide copolymer coagulant, acrylic latex, fatty alcohol alkoxylate, or anionic polyacrylamide. As previously discussed, the clays may include one or more of aluminum phyllosilicate clay, hydrous aluminum silicate, phyllosilicate (mica), and hydrous magnesium silicate (talc). Other clays suitable for use in thermal shielding for vehicles may be also be substituted or use in conjunction with the clays previously discussed. Table 3 below shows the ingredients used to make the fourth example thermal barrier material of the present subject matter and, for each ingredient, the percent-by-weight of the ingredient used in a slurry to be made into the thermal barrier material in a paper making machine.

Fourth Example Thermal Barrier Material

TABLE 3

| | |
|---|---|
| one or more of: aluminum phyllosilicate clay, hydrous aluminum silicate, phyllosilicate (mica), or hydrous magnesium silicate (talc) | 26-42 |
| one or more of: magnesium silicate, alumina trihydrate, alumino-borosilicate glass, rock wool, basalt fiber, acrylamide copolymer coagulant, acrylic latex, fatty alcohol alkoxylate, or anionic polyacrylamide, dye | 58-74 |

Additionally, the previously-disclosed example embodiments of the TI650 and TI1000 (TI1K) thermal barrier materials may be combined and configured as desired to form a fifth example thermal barrier material as shown in Table 4 below. Like the previous example thermal barrier materials, the fifth example thermal barrier material, when exposed to a temperature of 400° Celsius, produces smoke having a density less than 5 g/cm$^3$ as measured according to the ISO 5659-2:2006(E) standard. Table 4 below shows the ingredients used to make the fifth example thermal barrier material of the present subject matter and, for each ingredient, the percent-by-weight of the ingredient used in a slurry to be made into the thermal barrier material in a paper making machine.

Fifth Example Thermal Barrier Material

TABLE 2

| | |
|---|---|
| magnesium silicate | 8-23 |
| aluminum phyllosilicate clay | 2-5 |
| hydrous aluminum silicate | 8-23 |
| hydrous magnesium silicate (talc) | 12-18 |
| phyllosilicate (mica) | 4-7 |
| alumina trihydrate | 17-43 |
| alumino-borosilicate glass | 2-6 |
| dye | 0.5-1.5 |
| rock wool | 6-8.5 |
| basalt fiber | 1-7 |
| acrylamide copolymer coagulant | 0.05-1.5 |
| acrylic latex | 0.05-1.2 |
| fatty alcohol alkoxylate | 0.01-0.05 |
| anionic polyacrylamide | 0.5-1.5 |
| cellulose fiber | 0-1.8 |

Additional example thermal barrier material compositions in accordance with the present subject matter are provided in Tables 5-11 below:

Sixth Example Thermal Barrier Material

TABLE 5

| | |
|---|---|
| one or more of: aluminum phyllosilicate clay, hydrous aluminum silicate, phyllosilicate (mica), or hydrous magnesium silicate (talc) | 26-42 |
| magnesium silicate | 8-23 |
| alumina trihydrate | 17-43 |
| alumino-borosilicate glass | 2-6 |
| dye | 0.5-1.5 |
| rock wool | 6-8.5 |
| basalt fiber | 1-7 |

TABLE 5-continued

| | |
|---|---|
| acrylamide copolymer coagulant | 0.05-1.5 |
| acrylic latex | 0.05-1.2 |
| fatty alcohol alkoxylate | 0.01-0.05 |
| anionic polyacrylamide | 0.5-1.5 |
| cellulose fiber | 0-1.8 |

Seventh Example Thermal Barrier Material

TABLE 6

| | |
|---|---|
| one or more of: aluminum phyllosilicate clay, hydrous aluminum silicate, phyllosilicate (mica), or hydrous magnesium silicate (talc) | 35-53 |
| magnesium silicate | 8-23 |
| alumina trihydrate | 17-43 |
| alumino-borosilicate glass | 2-6 |
| dye | 0.5-1.5 |
| rock wool | 6-8.5 |
| basalt fiber | 1-7 |
| acrylamide copolymer coagulant | 0.05-1.5 |
| acrylic latex | 0.05-1.2 |
| fatty alcohol alkoxylate | 0.01-0.05 |
| anionic polyacrylamide | 0.5-1.5 |
| cellulose fiber | 0-1.8 |

Eighth Example Thermal Barrier Material

TABLE 7

| | |
|---|---|
| one or more of: aluminum phyllosilicate clay, hydrous aluminum silicate, phyllosilicate (mica), or hydrous magnesium silicate (talc) | 26-53 |
| magnesium silicate | 17-23 |
| alumina trihydrate | 17-43 |
| alumino-borosilicate glass | 2-6 |
| dye | 0.5-1.5 |
| rock wool | 6-8.5 |
| basalt fiber | 1-7 |
| acrylamide copolymer coagulant | 0.05-1.5 |
| acrylic latex | 0.05-1.2 |
| fatty alcohol alkoxylate | 0.01-0.05 |
| anionic polyacrylamide | 0.5-1.5 |
| cellulose fiber | 0-1.8 |

Ninth Example Thermal Barrier Material

TABLE 8

| | |
|---|---|
| aluminum phyllosilicate clay, hydrous aluminum silicate, phyllosilicate (mica), and hydrous magnesium silicate (talc) | 26-42 |
| magnesium silicate | 8-12 |
| alumina trihydrate | 35-43 |
| alumino-borosilicate glass | 2-6 |
| dye | 0.5-1.5 |
| rock wool | 6-8.5 |
| basalt fiber | 4-7 |
| acrylamide copolymer coagulant | 0.05-1.5 |
| acrylic latex | 0.05-0.95 |
| fatty alcohol alkoxylate | 0.01-0.05 |
| anionic polyacrylamide | 0.5-1.5 |
| cellulose fiber | 0 |

Tenth Example Thermal Barrier Material

TABLE 9

| | |
|---|---|
| aluminum phyllosilicate clay, hydrous aluminum silicate, phyllosilicate (mica), and hydrous magnesium silicate (talc) | 35-53 |
| magnesium silicate | 17-23 |
| alumina trihydrate | 17-23 |
| alumino-borosilicate glass | 2-6 |
| dye | 1-1.5 |
| rock wool | 6-8 |
| basalt fiber | 1-6 |
| acrylamide copolymer coagulant | 0.05-1.5 |
| acrylic latex | 0.07-1.2 |
| fatty alcohol alkoxylate | 0.01-0.05 |
| anionic polyacrylamide | 0.5-1.5 |
| cellulose fiber | 1-1.8 |

Eleventh Example Thermal Barrier Material

TABLE 10

| | |
|---|---|
| aluminum phyllosilicate clay, hydrous aluminum silicate, phyllosilicate (mica), or hydrous magnesium silicate (talc) | 26-42 |
| magnesium silicate, alumina trihydrate, alumino-borosilicate glass, rock wool, basalt fiber, acrylamide copolymer coagulant, acrylic latex, fatty alcohol alkoxylate, or anionic polyacrylamide, dye | 58-74 |

Twelfth Example Thermal Barrier Material

TABLE 11

| | |
|---|---|
| aluminum phyllosilicate clay, hydrous aluminum silicate, phyllosilicate (mica), or hydrous magnesium silicate (talc) | 35-53 |
| magnesium silicate, alumina trihydrate, alumino-borosilicate glass, rock wool, basalt fiber, acrylamide copolymer coagulant, acrylic latex, fatty alcohol alkoxylate, or anionic polyacrylamide, dye, cellulose fiber | 47-65 |

Except for the basalt fibers, the fibers and clays of the example thermal barrier material compositions in Tables 1-11 may be combined with water (between 7 and 50° C.) into a slurry using a pulper. To maintain the length of the basalt fibers, they may be added directly to the mixing chest and homogenized into the mixing stock to avoid the shear forces generated in the pulper. The latex is then added and precipitated onto the fiber and fillers. The resulting slurry is spread onto the conveyor belt at the wet end of a traditional Fourdrinier paper making machine forming a wet web of fibers. If the thermal barrier material is to be combined with an acoustic absorption barrier, the slurry may be spread onto a thin sheet of the acoustic absorption material, which may have been prepared with holes to facilitate binding the two layers together. In the machine, the wet web is dewatered and dried. The resulting web can then be cut into desired shapes and molded if desired to fit into areas where it is to be used.

Testing

Most of the tests described below were carried out according to the corresponding established industry method (typically an ASTM standard). However, due to the subjective nature of the offensive odor testing, internal testing methods were developed that quantified the intensity and offensiveness of odors produced by prior art thermal barrier materials and by thermal barrier materials of the present subject matter. An objective test for the presence of chemicals known to produce offensive odors also was carried out. In addition, the thermal masking tests were conducted using an internal testing method historically used to assess various thermal conduction properties of heat shield insulating material. These tests are detailed below.

1. Cold Formability and Vibration Testing

Figure 4:
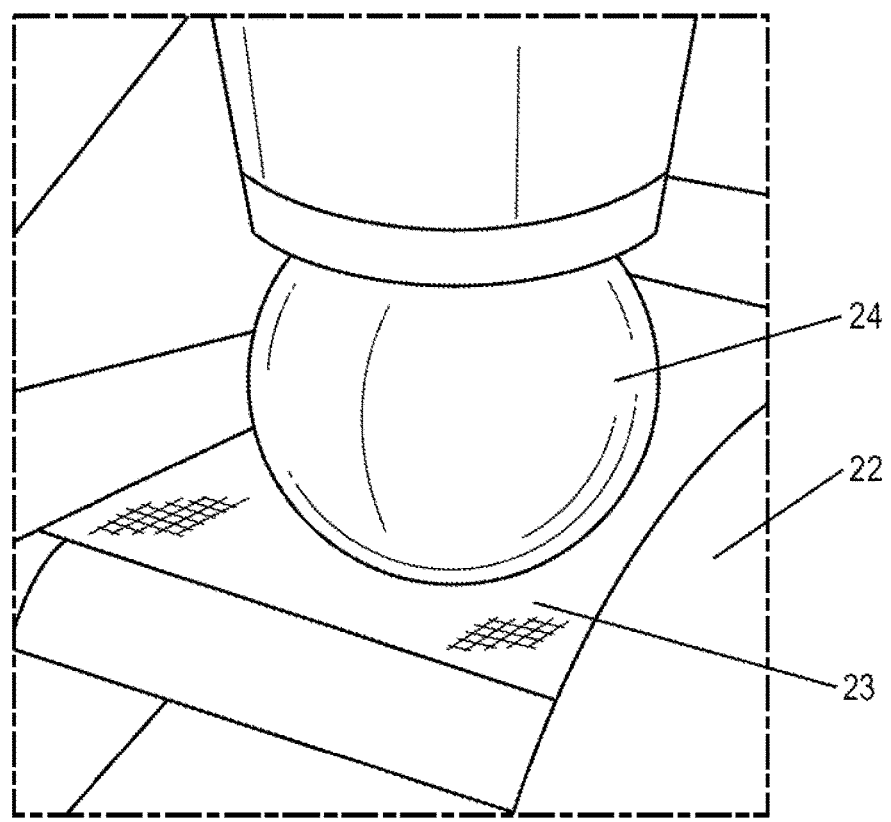
FIG. 4 is an illustration of a test device designed to test the cold formability of the thermal barrier material of the thermo-acoustic barrier.
Figure 5:
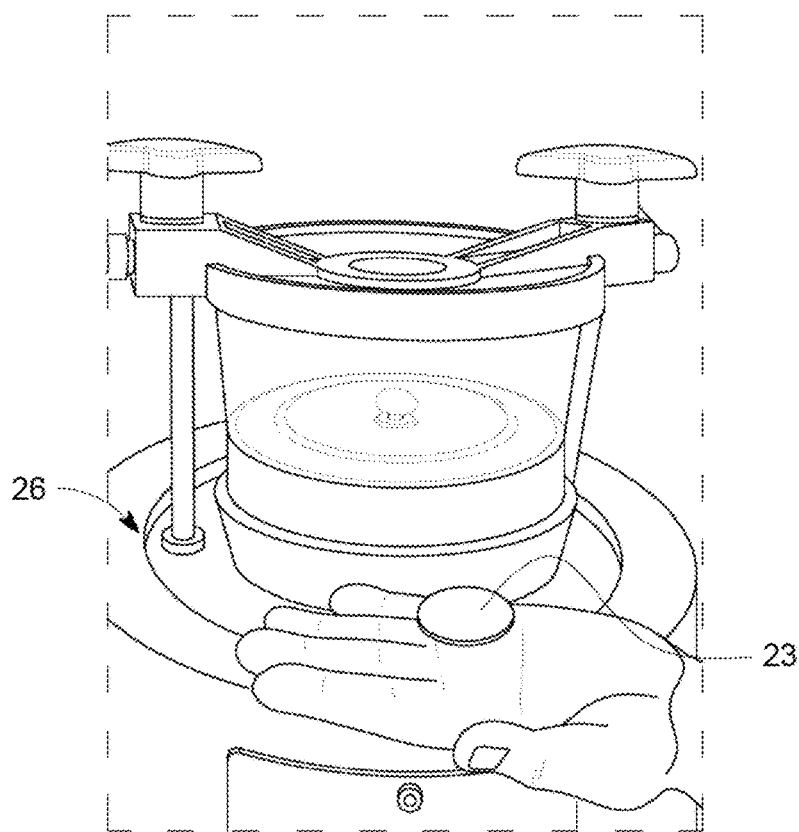
FIG. 5 is a photograph of a cup-shaped piece of the thermal barrier material formed according to the method of FIG. 3 and following heat and breakage test.

FIGS. 4 and 5 illustrate devices used to test the cold formability of thermal barrier material made according to the above described process. The test was carried out according to test method WI-TP-033_0. Both the TI650 and the TI1000 (TI1K) embodiments of the thermal barrier materials were tested. For each material, a circular sample 23 of the material was die-cut from a sheet and positioned over a spherical depression on the anvil of a press 22. A spherical ram 24 was then pressed onto the sample until the sample was urged into the depression, thereby molding the sample into a bowl-shaped configuration.

After each sample was molded into a bowl shape as described, it was heated in a furnace to 400° C. for 30 minutes and then placed in a tabletop shaker 26 (FIG. 5) for 5 minutes. Flat die cut specimens that had not been molded also were heated and shaken in this manner. This test sought to simulate the heat and vibration that might be experienced by the material when used in a vehicle. If the sample breaks into several pieces after heating and shaking or displays large separations, then it is likely that the material will crack or break up during crash forming of a commercial heat shield or during normal use. As shown in the summary test results chart of FIG. 11, the test revealed for the TI650 material that there were no cracks and the sample was intact after heating and vibration as described. The TI1000 (TI1K) material was observed to exhibit some small cracks, but the sample was otherwise in-tact after heating and vibration. The conclusion is that the thermal barrier material of the present subject matter exhibits acceptable cold formability properties.

Figure 5A:
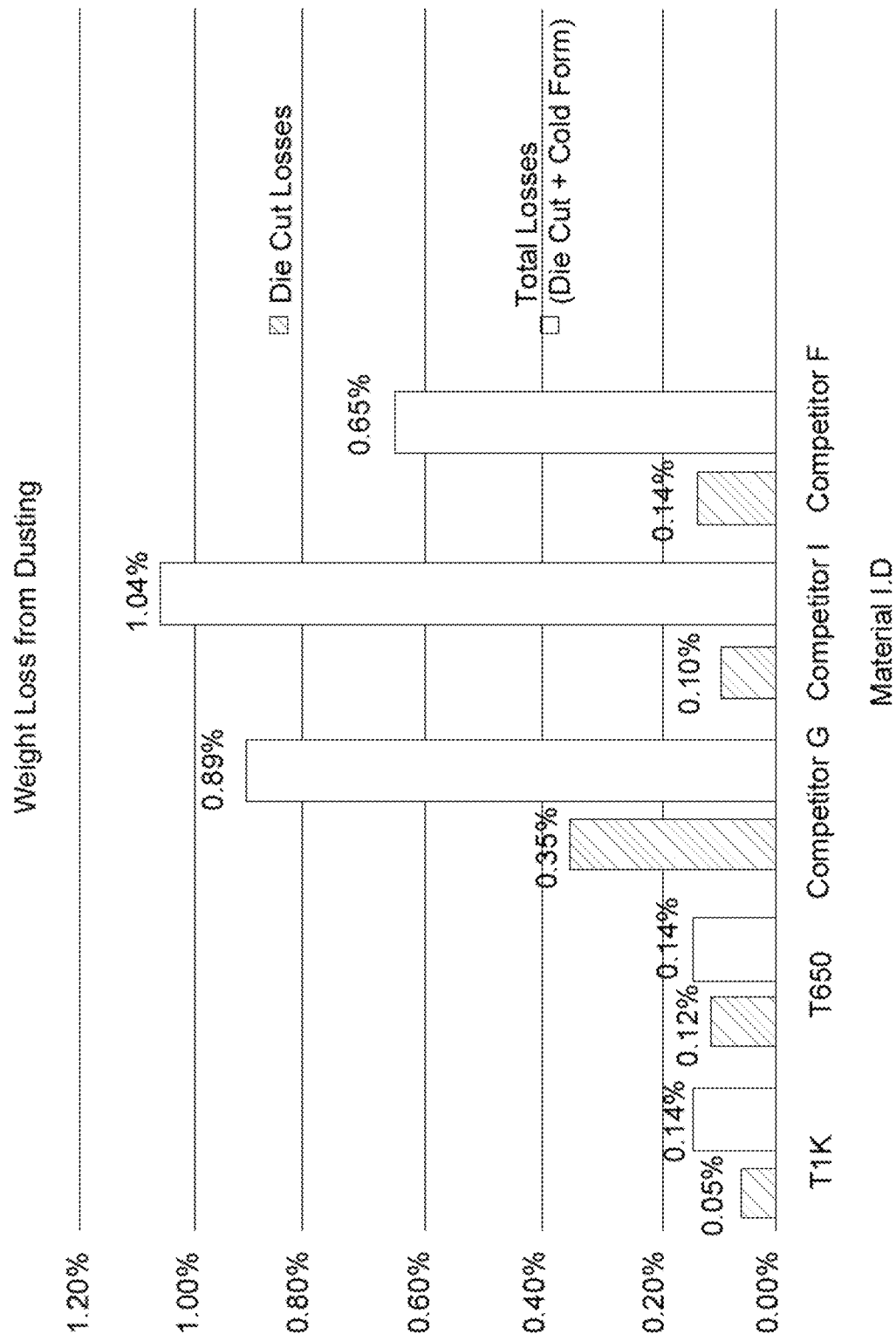
FIG. 5a is a bar graph showing results of testing for loss of mass due to dusting for the thermal barrier of the present subject matter and prior art thermal barriers.

To determine loss of mass due to dusting compared to prior art thermal barrier materials, die-cut and cold formed thermal barrier samples of the present subject matter and samples of prior art thermal barrier materials were tested. In each case, a sample was weighed, heated to 400° C. for 30 minutes, placed in a table top shaker for 5 minutes, and then weight again. Any loss in weight is due to dusting of material away from the sample during the heating and shaking process. FIG. 5a shows the results of these tests. As can be seen, for the three prior art samples tested, including Competitor G, Competitor I, and Competitor F, total loss of weight due to dusting (loss from die-cut sample plus loss from cold formed sample) ranged between 0.65% and 1.04%. Loss from the die cut sample was significantly less than loss from the cold formed sample for each of these prior art thermal barrier materials.

In stark contrast, the total loss of weight due to dusting for the TI1000 (TI1K) thermal barrier sample under the same test conditions was a mere 0.14% with about half of the loss (0.06%) being due to die-cut sample loss. For the TI650 sample of the present subject matter, total loss of weight was still a mere 0.14% but the great majority of the loss (0.12%) was due to dusting losses from the die-cut sample. The cold formed sample lost only 0.02% of its weight during the test. The conclusion is that heat barriers formed according to the present subject matter exhibit far less weight loss due to dusting than do the prior art heat barriers tested.

2. Smoke and Offensive Odor Test

Figure 6:
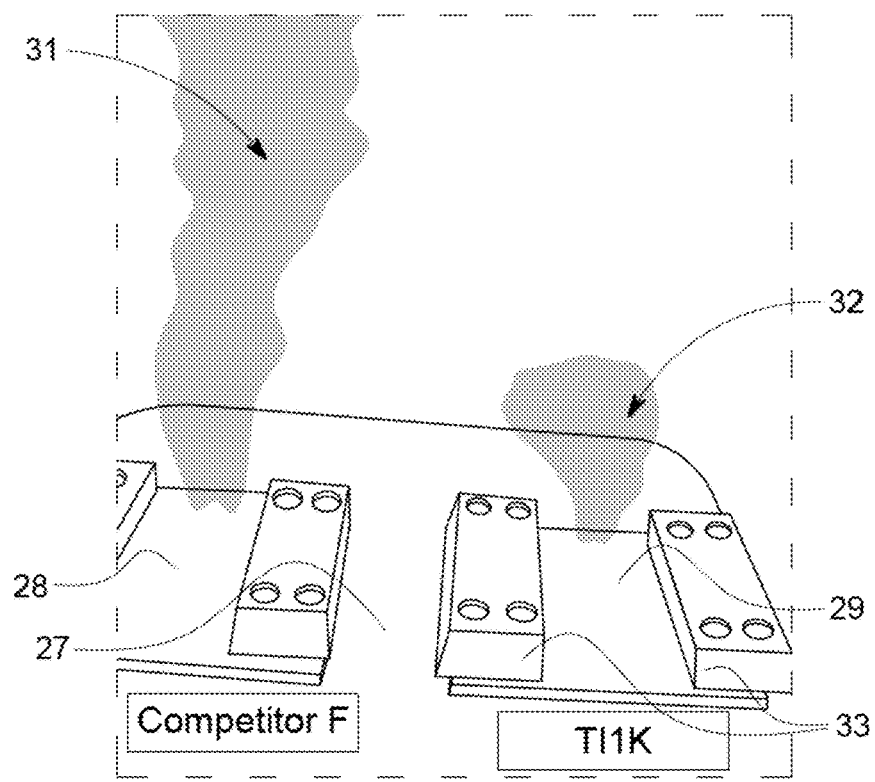
FIG. 6 is a photograph showing the side-by-side testing of a prior art thermal barrier and a thermal barrier of the present subject matter for smoke and offensive odor emissions when heated.
Figure 7:
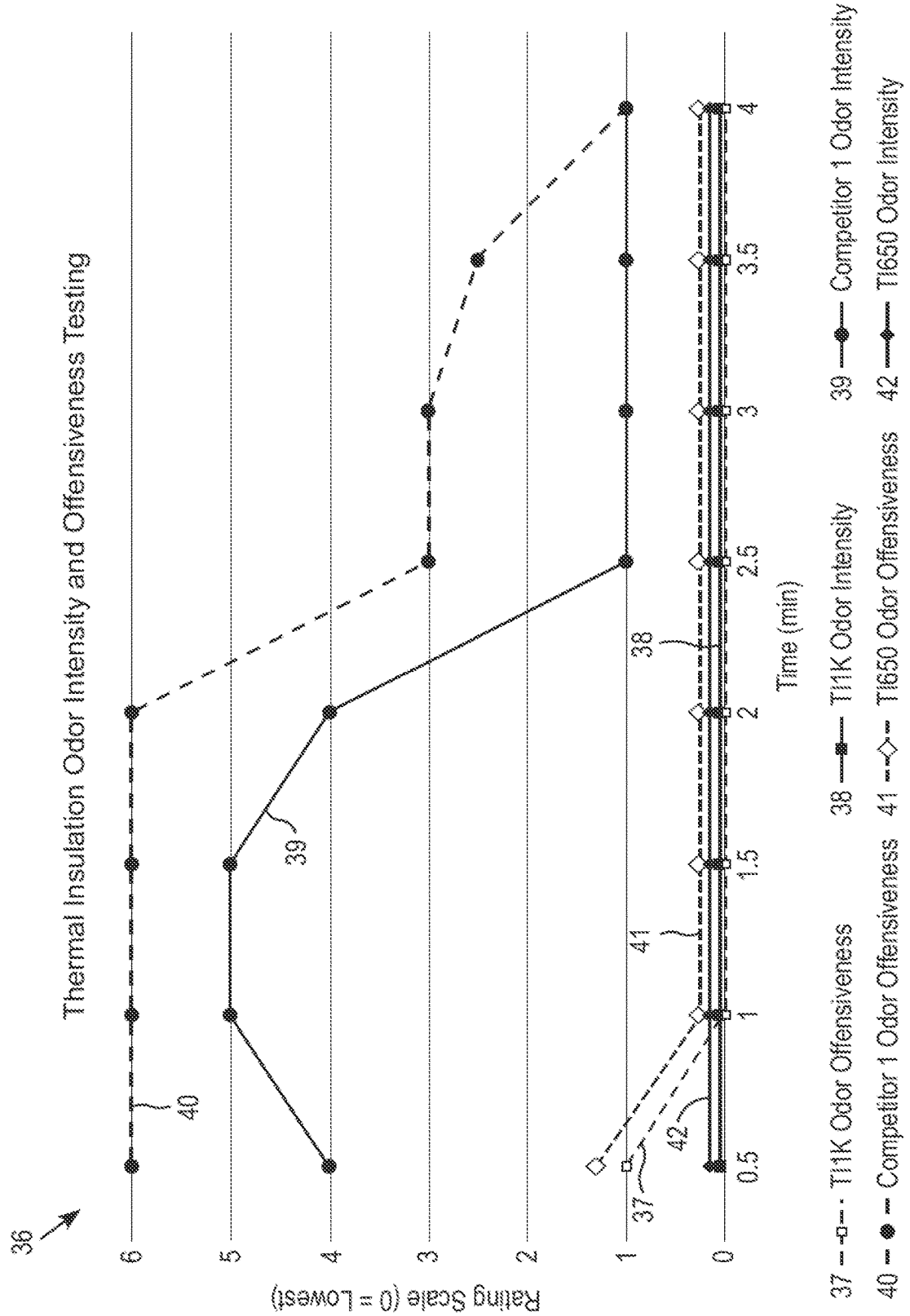
FIG. 7 is a chart showing results of the smoke and offensive odor test shown in FIG. 5.

FIGS. 6 and 7 illustrate subjective testing of the thermal barrier material of this present subject matter for the production of smoke and offensive odor at high temperatures. As discussed above, consumer complaints have focused on this unpleasant aspect of the prior art. For this test, a lab hotplate 27 was heated to 400° C. A sample of prior art thermal barrier material 28 (i.e., Competitor F) was placed on the hotplate 27 and held down by weights 33. The material was then observed by members of a panel who focused on odor produced by the sample over time as its temperature rose. Members of the panel rated odors produced by the sample for intensity and offensiveness over a 5-minute period. All responses of the panel members were then tabulated.

The same test was carried out with a sample of the TI1000 (TI1K) thermal barrier sample 29 made according to the present subject matter and a prior art thermal barrier with similar specifications. Again, the panel members rated the intensity and offensiveness of odors produced by the sample just as they had done with the prior art sample 28. The results of this test are shown in the chart 36 of FIG. 7, which plots the results of the tests on a scale of rating vs. time. As can be seen, the intensity of odors produced by the prior art thermal barrier material 39 was rated between 4 and 5 from 0.5 minutes until 2 minutes before slowly settling at a rating of about 1 after 2.5 minutes. The offensiveness 40 of these odors was rated even higher at 6 until 2 minutes into the test before slowly falling to 1 at 4 minutes.

In contrast, the intensity 38, 42 of odors produced by the TI1000 (TI1K) and TI650 samples made according to the present subject matter (chart 41) rated very low at just above zero for the full duration of the test. Offensiveness 37, 41 of these odors for these samples rated between 1 and 1.5 at the beginning, ramping down to just above zero at one minute into the test. Thus, thermal barriers made according to the present subject matter showed a drastic reduction in intensity and offensiveness of odors produced at high temperatures compared to those produced by the prior art thermal barrier.

In addition to these subjective tests, an objective odor evaluation was commissioned by an outside laboratory. The laboratory tested liberated gases from a sample of prior art thermal barrier material and a sample of thermal barrier material made according to the present subject matter when heated as described above. Gas Chromatography (GC) and Mass Spectrometry (MS) techniques were used to determine the presence of 1-butanol and Dimethoxymethane, both deemed by most humans to be associated with and indicative of offensive odors.

As can be seen from the summary chart of FIG. 11, the prior art sample was determined to produce 4.58 parts per million (ppm) of 1-butanol while the TI1000 (TI1K) sample produced less than 3 ppm, less than 1 ppm and, in this test, no detectable 1-butanol. As for Dimethoxymethane, the prior art sample produced 190 ppm while the TI1000 (TI1k) sample of the present subject matter produced less than 100 ppm, less than 50 ppm and specifically 42.6 ppm. Such levels are considered indicative of low levels of offensive odors to humans.

FIG. 12 shows the same data for the TI650 thermal barrier sample vs the comparative prior art sample. The prior art sample produced 6.14 ppm of 1-butanol while the TI650 sample produced less than 4 ppm, less than 2 ppm, and in this test, no detectable 1-butanol. The prior art sample produced 224 ppm Dimethoxymethane while the TI650 sample of the present subject matter produced less than 150 ppm, less than 100 ppm and, in this particular test, 55 ppm. Such ranges are considered to be indicative of low amounts of offensive odors. This objective testing supports the conclusions of the subjective tests that a thermal barrier of the present subject matter produces far less offensive odors when heated than does the prior art.

The density of produced smoke for the barriers of the present subject matter also was measured according to the ISO 5659-2:2006(E) standard. The measured density for both the TI650 and the TI1000 (TI1K) samples was less than 5 g/cm$^3$, less than 2 g/cm$^3$, and more specifically measured to be about 0.88 g/cm$^3$. Such smoke densities are considered barely detectable. As can be seen in FIG. 6, which shows the prior art sample 28 and the TI1000 (TI1K) sample 29 side-by-side on a 400° C. hotplate 27, the density of smoke 32 produced by the TI1000 (TI1K) sample 29 is far less than the density of smoke 31 produced by the prior art sample 28. The conclusion is that the high temperature thermal barrier material of the present subject matter produces negligible smoke when heated to high temperatures whereas the prior art produces significant smoke of which consumers complain.

3. Shock Flame Testing

Figure 8:
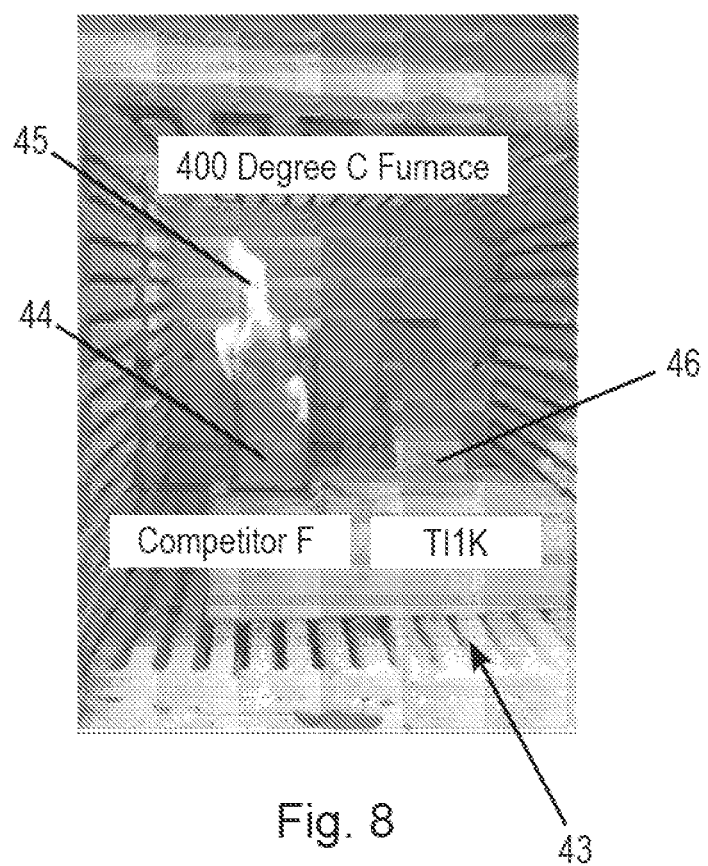
FIG. 8 is a photograph showing the side-by-side testing of a prior art thermal barrier and a thermal barrier of the present subject matter for flame ignition point when heated.

A prior art thermal barrier material (i.e., Competitor F) and the TI1000 (TI1K) thermal barrier material of the present subject matter were tested to determine their tendency to ignite at high temperatures. These two products have similar maximum temperature specifications of 1000° C. The test setup is shown in FIG. 8. A furnace 43 was preheated to a temperature of 650° C. before placing a 2-inch by 6-inch prior art sample (i.e., Competitor F) and a 2 inch by 6 inch sample of the TI1000 (TI1K) thermal barrier 46 in the furnace. A viewing port in the furnace wall allowed the flame point and smoke production, if any, to be visually determined. After a short time in the furnace, the prior art thermal barrier sample 44 (i.e., Competitor F) caught fire 45 as seen in FIG. 8 and began to burn. This is considered a catastrophic failure of the barrier. The TI1000 (TI1K) thermal barrier sample 46 of the present subject matter did not ignite at 650° C. In fact, TI1000 (TI1K) thermal barrier sample 46 was subsequently tested at its design temperature of 1000° C. and again did not ignite or fail.

Similarly, a prior art thermal barrier material and the TI650 thermal barrier 15 material of the present subject matter were tested for ignition using the same procedure. These two products have similar maximum temperature specifications of 650° C. Again, the two samples were placed in a furnace pre-heated to 650° C. and observed. As shown in the photograph of FIG. 12, the prior art sample ignited and failed at this temperature while the TI650 sample of the present subject matter did not.

4. Thermal Mapping Tests

Prior art thermal barriers and thermal barriers of the present subject matter were tested to determine the thermal conductivity of the material. This test is sometimes referred to as a thermal mapping test and was carried out according to ASTM standard F433. In the test, a sample of interest was placed directly on a pre-heated 400° C. hotplate. An infrared thermometer was used to map the rise in temperature of the top (exposed) side of the sample. The test was conducted for samples of thickness 0.8 mm and 1.0 mm for each of a prior art thermal barrier material, the TI650 barrier of the present subject matter, and the TI1000 (TI1K) barrier of the present subject matter. The results are shown in FIG. 7 where the charts on the right show graphically that the prior art thermal barrier (i.e., Competitor 1) conducted significantly more heat to its exposed face than did either the TI650 or the TI1000 (TI1K) samples of the present subject matter. This is true for both the 0.8 and 1.0 mm thicknesses of the samples.

Figure 9:
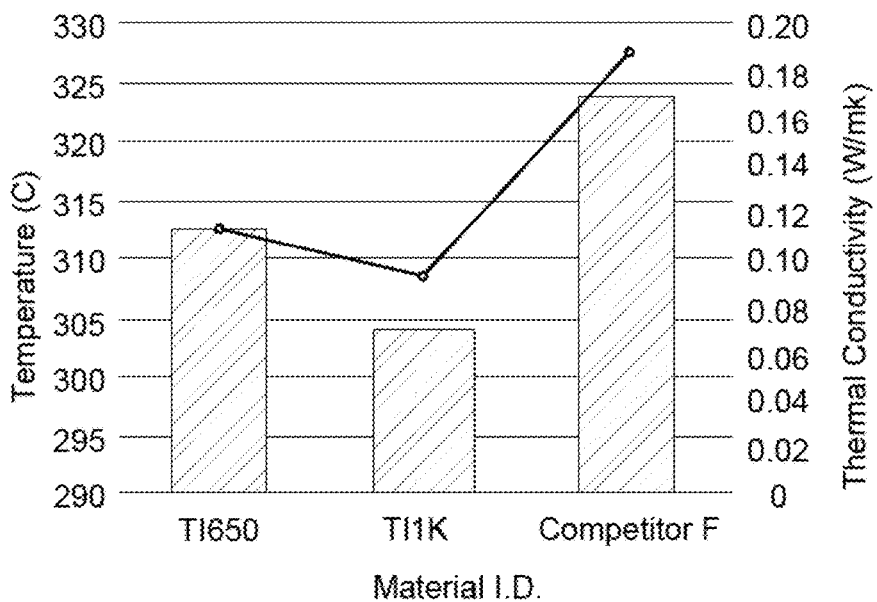
FIG. 9 shows charts and associated graphs illustrating the results of side-by-side testing of a prior art thermal barrier and a thermal barrier of the present subject matter for thermal conductivity (thermal mapping).
Figure 9:
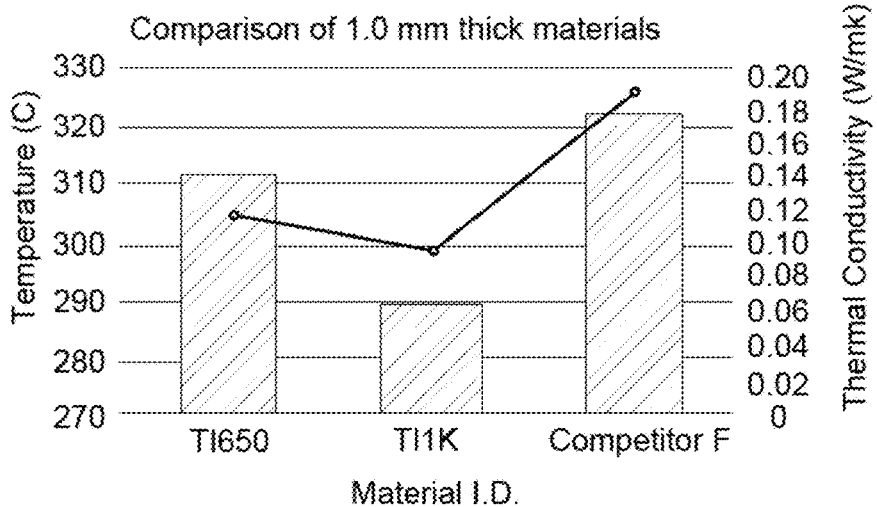

The test results are shown numerically on the left in FIG. 9. For the 0.8 mm thick samples, the exposed face of the prior art sample (i.e., Competitor F) rose to a temperature of 324° C. while the exposed faces of the TI650 and TI1000 (TI1K) samples rose to only 313° C. and 304° C. respectively. Similarly, for the 1.0 mm thick samples, the exposed face of the prior art sample (i.e., Competitor F) rose to 323° C. while the exposed faces of the TI650 and TI1000 (TI1K) samples rose to temperatures of 312° C. and 289° C. respectively. These results demonstrate a thermal conductivity (thermal K) for the prior art thermal barrier material of 0.188 while the conductivity of the thermal barriers of this present subject matter were 0.114 for the TI650 material and 0.095 for the TI1000 (TI1K) material. The conclusion is that thermal barriers of the present subject matter have significantly lower thermal conductivities than the prior art and transmit less heat from one surface to the opposite surface.

5. Toxicity of Generated Gases Test

A sample of prior art thermal barrier material (i.e., Competitor F) and a sample of the TI1000 (TI1K) barrier material of the present subject matter were tested according to ASTM standard 800 relating to Measurement of Gases Present or Generated During Fires. Specifically, gasses produced by these samples when burned were collected and analyzed using Fourier Transform Infrared Spectroscopy (FTIR) for toxic compounds contained in the resulting smoke. The testing measured the presence of the following compounds: CO; $CO_2$; HCl; HCN; HBr; HF; NO; $NO_2$; and $SO_2$. With the exception of carbon monoxide (CO) and carbon dioxide ($CO_2$), none of the toxic compounds were present. As for CO and $CO_2$ levels in the gasses were determined and are presented in the table of FIG. 10. As can be seen, the TI1000 (TI1K) thermal barrier material produced more than 8 times less CO and more than 13 times less $CO_2$ than the prior art thermal barrier material (i.e., Competitor F), a substantial and significant improvement. The sample of the TI1000 (TI1K) thermal barrier material produced less than 100 ppm CO gas, less than 50 ppm, and about 46 ppm as measured according to ASTM 800 standards. The sample of the TI1000 (TI1K) thermal barrier material produced less than 700 ppm of $CO_2$ gas, less than 600 ppm, and about 599 ppm as measured according to ASTM 800 standards.

6. Summary of Testing

FIG. 11 presents a table comparing results of the above described testing and other tests for a sample of the TI1000 (TI1K) thermal barrier material. Also shown are the results of the same tests for a sample of prior art thermal barrier material with similar performance specifications. Results for the prior art sample are shown in column 4 while results for the TI1000 (TI1K) sample of the present subject matter are shown in column 5. First, the caliper (thickness) and density of each sample was measured using the indicated ASTM standards. The Caliper of the prior art sample was determined to be 0.80 mm and its density was determined to be 1.15 g/cm$^3$. This compares to the TI1000 (TI1K) sample of the present subject matter, which had a caliper of 0.857 mm and a density of 0.90 g/cm$^3$. The two samples were very similar in thickness and density.

A horizontal flame spread test was conducted on the two samples according to SAE J369 testing standards. In this test, each sample was suspended in a horizontal orientation and a Bunsen burner was placed beneath one end of the sample. If the sample ignited and the flame did not self-extinguish, a rate at which the flame was observed to spread would be tabulated. In this test, the prior art sample did not ignite (DNI) and the sample of the TI1000 (TI1K) thermal barrier also did not ignite.

A compression/recovery test was conducted on both samples according to ASTM F36K standards using an Armstrong Static Indentation Machine. This test measures the ability of the material to absorb compressive forces and, once compressed, how well the material returns to its original caliper. The thickness of the sample is measured and then the sample is subjected to an extreme load for a specified time sufficient to compress the material. The load is then removed and the material is allowed to rebound partially to its original thickness. The final thickness is then measured. The rebounded thickness divided by the original thickness represents the compression/rebound measurement expressed as a percentage. Greater rebound is desirable. In these tests, the prior art sample rebounded by 16/28 or 57% while the sample of the present subject matter rebounded by 20/27 or 74%. Thus, a thermal barrier of the present subject matter is more tolerant of compressive loads than the thermal barrier of the prior art.

The thermal conductivity of each sample was measured according to the procedure outlined above. The results are tabulated again in the summary chart of FIG. 11.

FIG. 12 presents a table comparing results of the above described testing and other tests for a sample of the TI650 thermal barrier material. Also shown are the results of the same tests for a sample of prior art thermal barrier material with similar performance specifications. As with tests for the TI1000 (TI1K) sample, results for the prior art sample are shown in column 4 while results for the TI650 sample of the present subject matter are shown in column 5. As can be seen from FIG. 12, the TI650 sample made according to the present subject matter performed significantly better than the prior art sample in virtually every test.

The foregoing disclosure has been set forth merely to illustrate the present subject matter and is not intended to be limiting. Examples have been selected merely to further illustrate features, advantages, and other details of the present subject matter. While examples may serve this purpose, the particular material compositions, amounts, proportions, and other conditions should not be construed in a limiting manner. Since modifications of the disclosed embodiments incorporating the spirit and substance of the present subject matter may occur to persons skilled in the art, the present subject matter should be construed to include everything within the scope of the appended claims and equivalents thereof.

What is claimed is:

1. A thermal barrier material for use in shielding components of a vehicle from hot surfaces comprising:
    35 to 53% of a plurality of clays by weight; and
    a remainder comprising one or more of:
        magnesium silicate, alumina trihydrate, alumino-borosilicate glass, rock wool, basalt fiber, acrylamide copolymer coagulant, acrylic latex, fatty alcohol alkoxylate, or anionic polyacrylamide, wherein
            a sample of the thermal barrier material, when exposed to a temperature of 400° Celsius, produces smoke having a density less than 5 g/cm$^3$ as measured according to the ISO 5659-2:2006(E) standard, and
            organic components of the thermal barrier material are limited to between 1.11% and 7.55% by weight.

2. The thermal barrier material of claim 1, wherein the remainder comprises:
    8 to 23% of magnesium silicate by weight;
    17 to 43% of alumina trihydrate by weight;
    2 to 6% of alumino-borosilicate glass by weight;
    6 to 8.5 of rock wool by weight;
    1 to 7% of basalt fiber by weight;
    0.05 to 1.5% of, acrylamide copolymer coagulant by weight;
    0.05 to 1.2% of acrylic latex by weight;
    0.01 to 0.05% of fatty alcohol alkoxylate by weight; and
    0.5 to 1.5% of anionic polyacrylamide by weight.

3. A thermal barrier material for use in shielding components of a vehicle from hot surfaces comprising:
    26% to 42% of a plurality of clays by weight; and
    a remainder comprising one or more of:
        magnesium silicate, alumina trihydrate, alumino-borosilicate glass, rock wool, basalt fiber, acrylamide copolymer coagulant, acrylic latex, fatty alcohol alkoxylate, or anionic polyacrylamide, wherein
            a sample of the thermal barrier material, when exposed to a temperature of 400° Celsius, produces smoke having a density less than 5 g/cm$^3$ as measured according to the ISO 5659-2:2006(E) standard, and
            organic components of the thermal barrier material are limited to between 1.11% and 7.55% by weight.

4. The thermal barrier material of claim 3, wherein the remainder comprises:
    8 to 23% of magnesium silicate by weight;
    17 to 43% of alumina trihydrate by weight;
    2 to 6% of alumino-borosilicate glass by weight;
    6 to 8.5 of rock wool by weight;
    1 to 7% of basalt fiber by weight;
    0.05 to 1.5% of, acrylamide copolymer coagulant by weight;
    0.05 to 1.2% of acrylic latex by weight;
    0.01 to 0.05% of fatty alcohol alkoxylate by weight; and
    0.5 to 1.5% of anionic polyacrylamide by weight.

* * * * *